United States Patent
Hansel

(10) Patent No.: US 11,271,267 B1
(45) Date of Patent: Mar. 8, 2022

(54) PRESSURE-BASED BATTERY EJECTION SYSTEM

(71) Applicant: Kitty Hawk Corporation, Mountain View, CA (US)

(72) Inventor: George James Hansel, San Francisco, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 0 days.

(21) Appl. No.: 15/809,831

(22) Filed: Nov. 10, 2017

(51) Int. Cl.
*H01M 50/20* (2021.01)
*H01M 50/24* (2021.01)

(52) U.S. Cl.
CPC ............ *H01M 50/20* (2021.01); *H01M 50/24* (2021.01); *H01M 2200/20* (2013.01); *H01M 2220/20* (2013.01)

(58) Field of Classification Search
CPC ............ H01M 2/1022; H01M 2/1094; H01M 2200/20; H01M 2220/20
See application file for complete search history.

(56) References Cited

U.S. PATENT DOCUMENTS

| | | | |
|---|---|---|---|
| 2008/0220315 A1* | 9/2008 | Dougherty | H01M 10/6566 429/53 |
| 2010/0065691 A1* | 3/2010 | Droney | B64C 7/02 244/53 R |
| 2013/0071706 A1* | 3/2013 | Lee | H01M 2/1061 429/62 |
| 2014/0211921 A1* | 7/2014 | Bandis | H01M 2/1094 378/91 |
| 2015/0162582 A1* | 6/2015 | Metz | H01M 2/12 429/53 |
| 2016/0090045 A1* | 3/2016 | Helmuth | B60R 3/02 180/89.17 |
| 2017/0170439 A1* | 6/2017 | Jarvis | H01M 2/12 |
| 2018/0159110 A1* | 6/2018 | Tuomola | B60K 1/04 |

* cited by examiner

*Primary Examiner* — Stewart A Fraser
*Assistant Examiner* — Brent C Thomas
(74) *Attorney, Agent, or Firm* — Van Pelt, Yi & James LLP

(57) ABSTRACT

A battery ejection system is disclosed. The battery ejection system comprises a pressure vessel, a battery submodule positioned at least partway in the pressure vessel and configured to release gas into the pressure vessel, and a seal of the pressure vessel configured to release in the event a pressure level in the pressure vessel exceeds a threshold pressure level. The battery submodule is configured to be ejected from an electrical connection in the event the seal is released.

22 Claims, 11 Drawing Sheets

PRESSURE-BASED BATTERY EJECTION SYSTEM

BACKGROUND OF THE INVENTION

In the event of a battery malfunction such as cell thermal runaway, batteries may produce hazardous gases and/or large amounts of heat. Techniques to detect and handle malfunctioning batteries would be desirable.

BRIEF DESCRIPTION OF THE DRAWINGS

Various embodiments of the invention are disclosed in the following detailed description and the accompanying drawings.

DETAILED DESCRIPTION

Figure 1A:
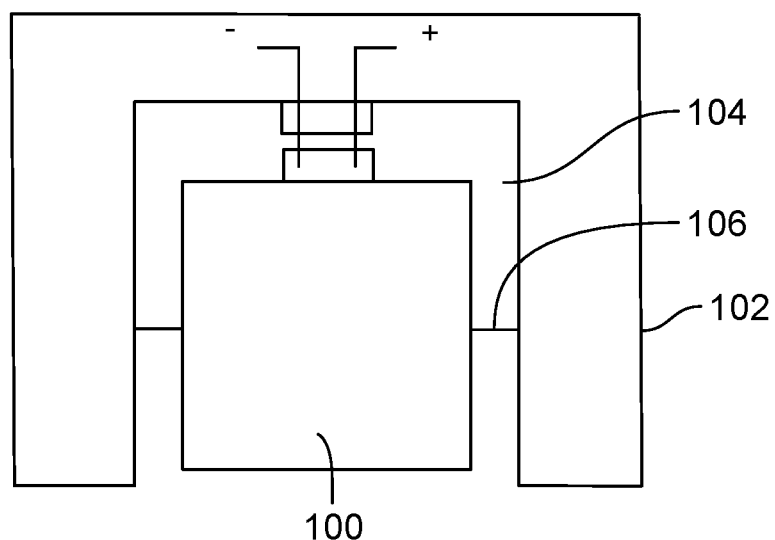
FIG. 1A is a diagram illustrating an embodiment of a pressure-based battery ejection system prior to battery ejection.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A battery ejection system is disclosed. The battery ejection system comprises a pressure vessel, a battery submodule positioned at least partially in the pressure vessel and configured to release gas into the pressure vessel, and a seal. The seal is configured to seal the pressure vessel in a first mode and is configured to release in a second mode. The second mode is triggered in the event a pressure level in the pressure vessel exceeds a threshold pressure level. The battery is configured to be disconnected from an electrical connection in the second mode.

In some embodiments, a pressure vessel includes or is a cavity which is formed by a structure and a battery of the battery ejection system is partially or completely sealed in such a cavity. In some embodiments, an electrical contact of the battery is positioned within the cavity. For example, the battery is connected to a wire or any other appropriate electrical component within the cavity. In the event of battery failure or malfunction, the battery may vent gases. In some embodiments, the battery is positioned in the cavity such that vented gases from the battery release into the cavity. In the event pressure in the cavity exceeds a threshold pressure that a seal of the cavity is designed to handle, the seal will release. In some embodiments, the battery is ejected from its electrical connection in the event the seal releases. For example, the seal holds the battery in the cavity to make electrical contact and the battery falls from the cavity in absence of the seal. In some embodiments, the force of the vented gas pushes the battery out of the cavity and ejects the battery electrically.

In some embodiments, a battery ejection system is used in an electric aircraft. An electric aircraft powered by batteries may require a lightweight system of detecting malfunctioning batteries and removing them from the aircraft's electrical systems. The pressure-based battery ejection system automatically electrically ejects batteries based on an amount of venting gases, which is a measure of battery malfunction. For example, a battery may release gases when it malfunctions whereas a properly functioning battery does not release gases or releases a low volume of gases. Active monitoring and ejection using monitors, gauges, processors, or other heavy equipment is not required. In some embodiments, the battery ejection system provides a reliable, safe, simple, and lightweight way of electrically ejecting malfunctioning batteries.

FIG. 1A is a diagram illustrating an embodiment of a pressure-based battery ejection system prior to battery ejection. In the example shown, battery 100 is positioned inside structure 102. Structure 102 may comprise part of an electrical load (or electrical connection to such an electrical load) that battery 100 provides power to. For example, structure 102 may comprise an aircraft framework. In the example shown, seal 106 between structure 102 and battery 100 creates cavity or pressure vessel 104. The seal as shown is positioned near one end of the battery, leaving a small portion of the battery unsealed. In some embodiments, the battery is configured to vent gases from a portion of the battery that is sealed in the cavity. In some embodiments, the battery includes a covering that directs gas released by the battery. For example, the battery may be stored in a can that has venting slots that direct where gas released from the battery may travel; such slots may direct any released gases from battery 100 into pressure vessel 104.

As shown, the battery has an electrical connection at the end of the battery that is pointing into cavity 104. The electrical connection is positioned at one end of the battery whereas the seal is positioned near the midsection of the battery (at least in this example). Battery 100 has an electrical connection with structure 102. In some embodiments, the electrical connection comprises wiring that allows the battery to provide or draw power. In some embodiments (not shown here), seal 106 does not wrap around the midsection of the battery but rather surrounds the battery such that all of the battery is within or otherwise enveloped by the cavity or pressure seal (e.g., seal 106 goes below or underneath battery 100). In some embodiments, the battery touches or is in contact with structure 102 at some portions of the battery such that there is no need for a seal where they make contact. For example, seal 106 may comprise discrete pieces of material that seal multiple gaps between battery 100 and structure 102.

In the event a battery fails, it may release gases. In some embodiments, vented gases are released into cavity 104. In some embodiments, seal 106 is designed to withstand up to a threshold level of pressure. The threshold level of pressure may be determined based on a level of battery malfunction that is critical. For example, using a slightly venting battery may be safer than ejecting the slightly venting battery and flying with less power in some cases of electric aircraft flight. A battery venting a large volume of gas and/or a lot of heat may pose a larger risk where it is worthwhile to eject the battery. The threshold level of pressure of the seal may map to an amount of gas corresponds to a high risk battery which cannot be used any longer. In the event pressure inside cavity 104 exceeds a threshold pressure of seal 106, the seal releases. In some embodiments, the pressure provides a force that ejects the battery from structure 102. In some embodiments, the release of the seal allows the battery to disconnect from its electrical connection. For example, gravity may cause the battery to fall from structure 102.

Figure 1B:
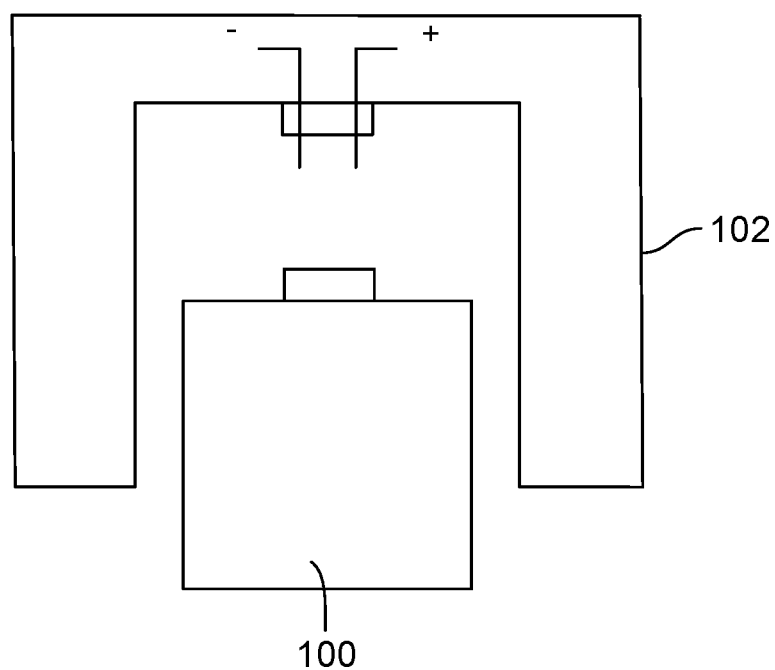
FIG. 1B is a diagram illustrating an embodiment of a pressure-based battery ejection system after battery ejection.

In the example shown, battery 100 is positioned under structure 102. In some embodiments, battery 100 is positioned atop structure 102. In some embodiments, the battery and structure are positioned on their sides (e.g. FIG. 1B is rotated 90 degrees). In all the examples shown, the positioning of the battery and structure may be implemented in a rotated orientation from what is illustrated. Regardless of the orientation, any venting slots (not shown) in a battery's can may be oriented to be facing upwards. This is because the emitted gases may be hot and rise upwards as a result. Venting slots which are positioned or otherwise oriented to be facing upward will more readily permit the hot gases to exit into the cavity or pressure vessel.

FIG. 1B is a diagram illustrating an embodiment of a pressure-based battery ejection system after battery ejection. In the example shown, seal 106 of FIG. 1A has released. In various embodiments, the seal ruptures or is pushed off intact. Release of the seal causes battery 100 to be ejected from its electrical connection with structure 102. In some embodiments, battery 100 is ejected from a high power electrical connection.

In some embodiments, seal 106 is reversible or replaceable. Battery 100 may be replaced with a new battery by removing the seal, placing a new battery in position such that it establishes electrical contact with structure 102, and replacing the seal or putting a new seal in place.

Figure 2A:
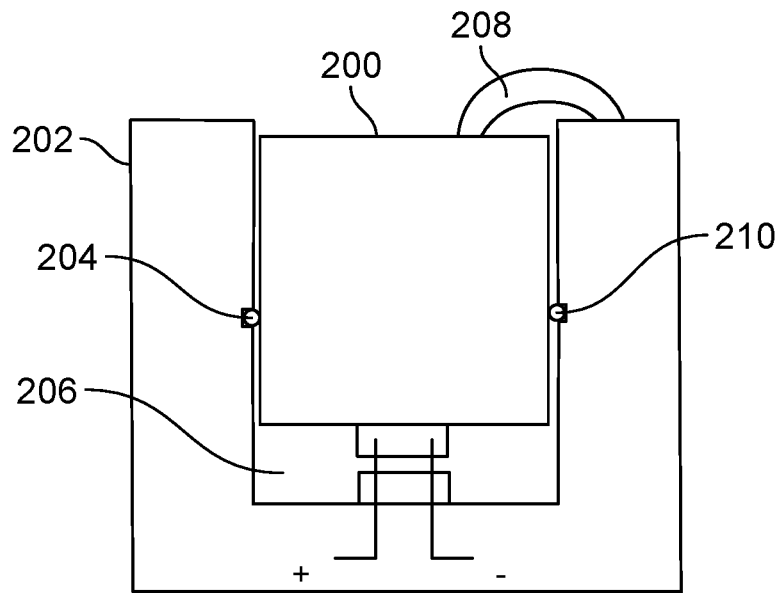
FIG. 2A is a flow diagram illustrating an embodiment of a pressure-based battery ejection system comprising a latch and o-rings prior to battery ejection.

FIG. 2A is a flow diagram illustrating an embodiment of a pressure-based battery ejection system comprising a latch and o-rings prior to battery ejection. In various embodiments, various configurations and combinations of seals are used in the pressure-based battery ejection system. In some embodiments, various components are used in combination to create the pressure vessel. The various components may perform separate functions. For example, one component may be used to hold the battery in a position wherein it maintains an electrical connection. The component may exert a force on the battery that pushes an electrical contact of the battery against an electrical contact of an electrical load it powers. The component may restrain the battery within a structure. Another component may be used to create an airtight seal around at least a portion of the battery and the structure.

In the example shown, battery 200 is positioned within structure 202. Battery 200 is held in place by latch 208. In some embodiments, latch 208 keeps battery 200 in electrical contact with structure 202. The latch may comprise a force-regulating latch that has zero deflection under force until it buckles and completely releases when subjected to a threshold amount of force. The latch may comprise a piece of bowed metal that springs from one stable position to another stable position after subjected to a large amount of force. A bistable spring mechanism may be used. In some embodiments, a latch or spring that has two stable positions and changes from one stable position to a second stable position after a certain amount of pressure is exerted is used, wherein one stable position causes the latch or spring to hold the battery in the cavity and another stable position releases the battery. In some embodiments, the latch or spring comprises a flattened portion that is attached to the structure (e.g. structure 202). The rest of the latch or spring may pivot around the flattened portion.

In the example shown, o-rings 204 and 210 are positioned between battery 200 and structure 202. In some embodiments, the o-rings create an airtight barrier but are not strong enough to hold battery 200 in place. For example, the o-rings may comprise a flexible material such as rubber. In the example shown, the o-rings are held in place via indents in structure 202. As shown, o-rings 204 and 210 create pressure vessel 206. The o-rings may prevent air from escaping from pressure vessel 206. The pressure vessel is bounded by structure 202 and the o-rings. In some embodiments, the front face of battery 200 as shown and a back face of battery 200 are flush against structure 202. O-rings 204 and 210 may block areas where air may escape from pressure vessel 206. In various embodiments, any number of o-rings are positioned between the battery and structure to provide an airtight seal and create pressure vessel 206. As shown, about half of battery 200 is sealed inside pressure vessel 206, including a portion of the battery that comprises an electrical contact. The electrical contact is in contact with an electrical contact of structure 202, creating an electrical connection. In some embodiments, battery 200 is configured to release gas into pressure vessel 206, causing a force to build up on latch 208 in the event the battery malfunctions.

Figure 2B:
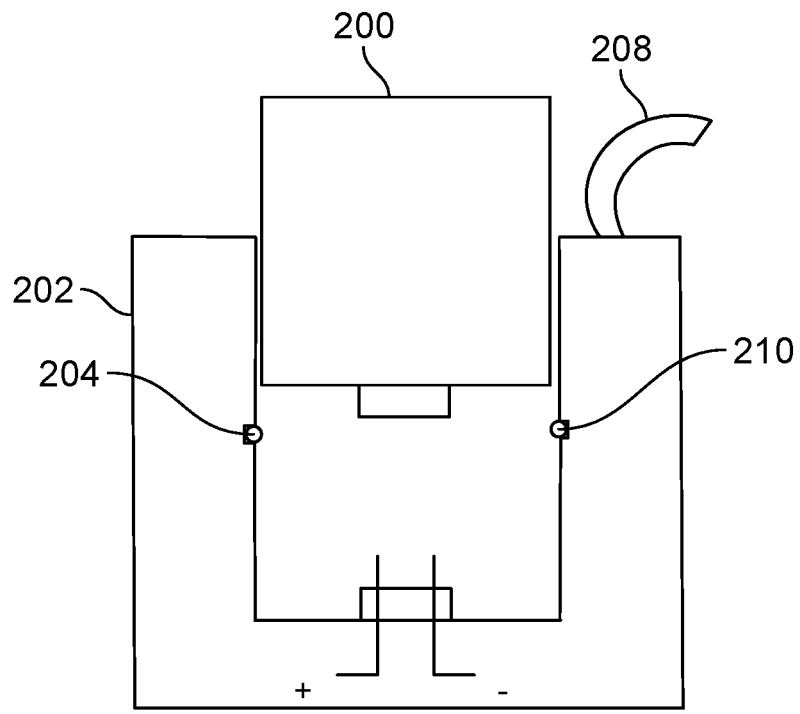
FIG. 2B is a flow diagram illustrating an embodiment of a pressure-based battery ejection system comprising a latch and o-rings after battery ejection.

FIG. 2B is a flow diagram illustrating an embodiment of a pressure-based battery ejection system comprising a latch and o-rings after battery ejection. In the example shown, latch 208 assumes an inverted position compared to its position in FIG. 2A. In some embodiments, the latch is configured to invert when subjected to a threshold amount of force. As shown, latch 208 no longer holds battery 200 in position and in electrical contact with structure 202. In some embodiments, battery 200 is ejected such that a pressure vessel no longer exists. In the example shown, battery 200 is ejected past o-rings 204 and 210. The o-rings are not in contact with the battery and a sealed cavity ceases to exist. The o-rings may be configured to allow the battery to slide past them in the event the battery is not held in position by another element, such as a latch.

As shown, battery 200 is no longer electrically connected to structure 202. In some embodiments, the electrical contact of battery 200 is configured to not reestablish an electrical connection with structure 202 after ejection, even in the event that battery 200 falls back into structure 202. In some embodiments, battery 200 is positioned underneath structure 202 and gravity causes battery 200 to fall from structure 202 after latch 208 ceases to hold battery 200 in electrical contact with the structure. In some embodiments, battery 200 and structure 202 are positioned on their sides such that battery 200 is ejected to one side rather than ejected down or up from the structure. In some embodiments, pressure from vented gases is sufficient to push battery 200 away from an electrical contact of the structure. For example, the battery may be pushed sufficiently far from an electrical contact of the structure such that it will not regain electrical contact.

In some embodiments, latch 208 is a reversible seal. For example, latch 208 may be returned to its original position in FIG. 2A. In some embodiments, a reversible seal is used to seal battery replacements that are put in place after an original battery is ejected.

Figure 3A:
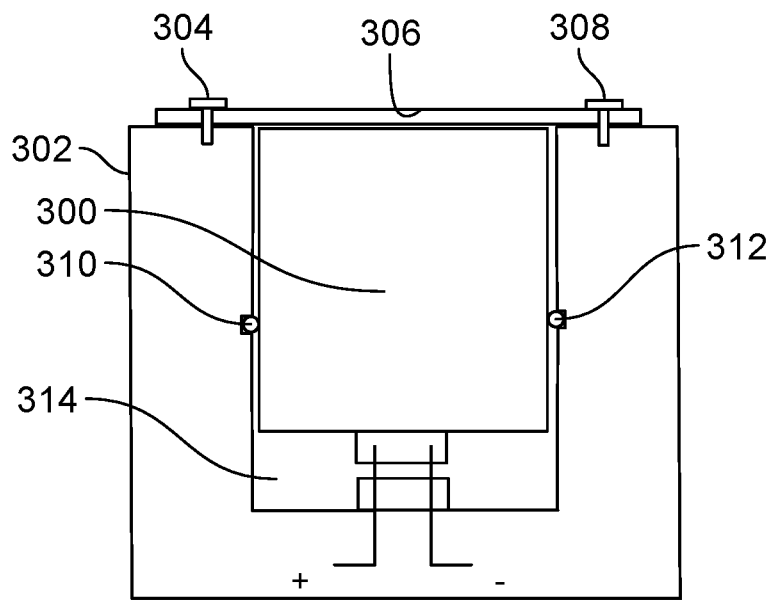
FIG. 3A is a flow diagram illustrating an embodiment of a pressure-based battery ejection system comprising bolts prior to battery ejection.

FIG. 3A is a flow diagram illustrating an embodiment of a pressure-based battery ejection system comprising bolts prior to battery ejection. In some embodiments, non-reversible seals are utilized. For example, once the seal is broken, it may not be reversed to an original position wherein it creates an airtight cavity surrounding at least a portion of the battery. In the example shown, battery 200 is held in electrical contact with structure 302 via panel 306. Panel 306 is bolted into structure 302 using bolts 304 and 308. O-rings 310 and 312 as shown create an airtight seal with battery 300, creating pressure vessel 314 from which air cannot escape.

Figure 3B:
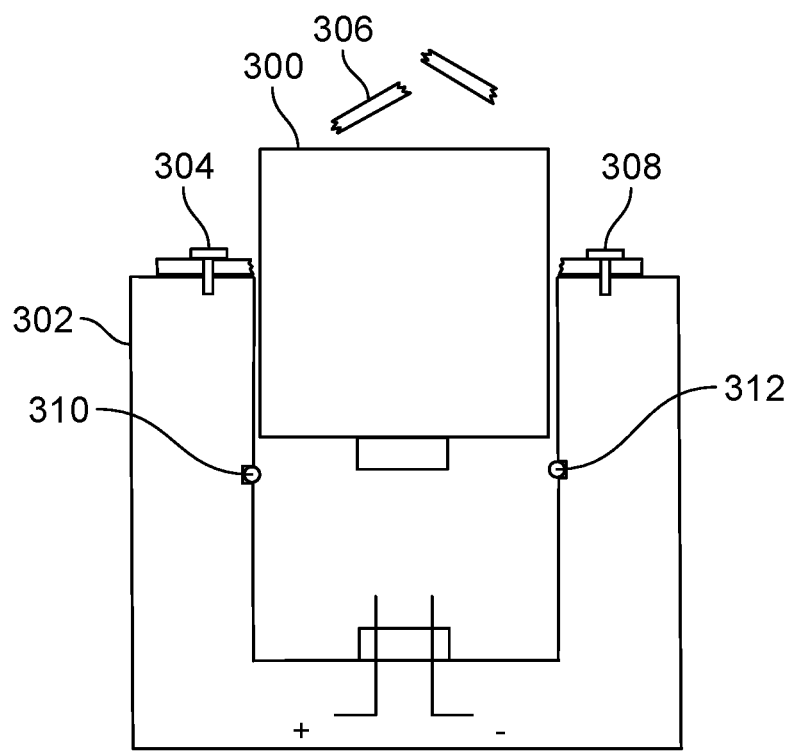
FIG. 3B is a flow diagram illustrating an embodiment of a pressure-based battery ejection system comprising bolts after battery ejection.

FIG. 3B is a flow diagram illustrating an embodiment of a pressure-based battery ejection system comprising bolts after battery ejection. In the example shown, panel 306 is fractured into multiple pieces. Panel 306 may be configured to break under a threshold amount of pressure. Bolts 304 and 308 remain intact and hold portions of panel 306 to structure 302. In some embodiments, bolts 304 and 306 are configured to shear under a threshold amount of force. In the event the bolts shear, panel 306 may be removed from structure 302 in one piece, causing battery 300 to be ejected from its electrical connection. For example, panel 306 and battery 300 may fall away from structure 302 due to gravity in the event battery 300 is positioned below structure 302.

Figure 4A:
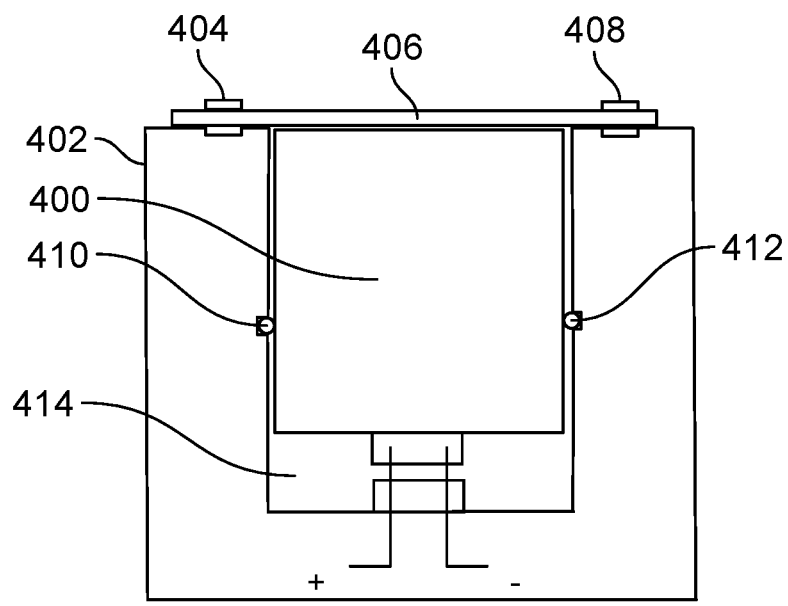
FIG. 4A is a diagram illustrating an embodiment of a pressure-based battery ejection system comprising magnets prior to battery ejection.

FIG. 4A is a diagram illustrating an embodiment of a pressure-based battery ejection system comprising magnets prior to battery ejection. In the example shown, battery 400 is completely sealed in pressure vessel 414 using panel 406, magnets 404 and 408, and o-rings 410 and 412. Magnets 404 and 408 hold panel 406 against structure 402, keeping battery 400 in contact with structure 402 at an end of the battery that comprises an electrical contact. In the example shown, panel 404 is held adjacent to structure 402 using magnets 404 and 408, which are attracted to magnets that are embedded in structure 402. In some embodiments, the magnets and panel do not create an airtight seal. O-rings 410 and 412 may create an airtight seal with battery 400, creating pressure vessel 414. In some embodiments, o-rings or other components are utilized to create a smaller pressure vessel than would otherwise be created by using a seal that encloses the entire battery in the pressure vessel. The positioning of the o-rings or airtight seal component may be determined based on a threshold pressure level of the magnets or restraining component. For example, in the event the magnets are displaced only under a force that is much larger than a force that maps to a dangerous level of gas venting, the o-rings may be positioned to create a small pressure vessel. The battery's enclosure or covering may ensure that released gas is released into the pressure vessel. The small pressure vessel may cause the magnets to be displaced in the event a dangerous level of gas venting occurs. In some embodiments, the panel and magnets hold battery 400 in a position wherein an airtight seal is created around a portion of the battery using o-rings 410 and 412.

Figure 4B:
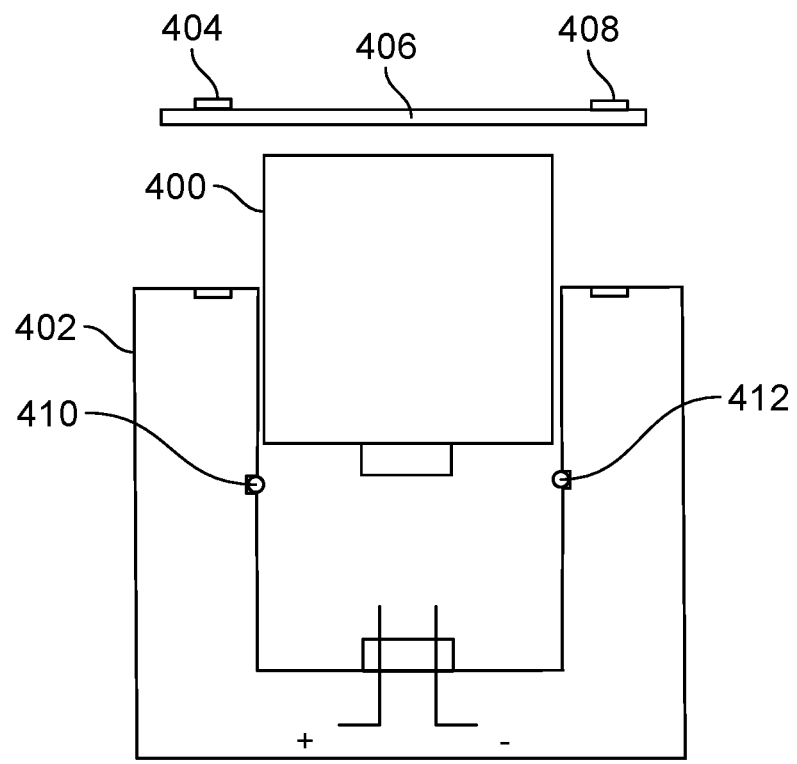
FIG. 4B is a flow diagram illustrating an embodiment of a pressure-based battery ejection system comprising magnets after battery ejection.

FIG. 4B is a flow diagram illustrating an embodiment of a pressure-based battery ejection system comprising magnets after battery ejection. In some embodiments, magnets 404 and 408 are configured to separate from magnets embedded in structure 402 when subjected to a threshold force. In the example shown, magnets 404 and 408 have separated from magnets embedded in structure 402, causing panel 406 to be removed from its prior position. As shown, panel 406 is not in contact with structure 402, allowing battery 400 to be ejected from its electrical connection.

In various embodiments, reversible or irreversible seal components are utilized in various positions around a battery. In some embodiments, seal components are used only between the battery and an electrical load the battery powers. For example, in lieu of o-rings between battery 400 and structure 402, a magnet may be used that is dislodged from its position with a specified amount of force. A latch may be used between a battery and an electrical load the battery provides power to create an airtight cavity. In some embodiments, seal components are used only externally on the battery and powered electrical load. For example, a battery may be completely enclosed in a pressure vessel constrained by a seal. In some embodiments, a combination of seal components in various positions is used.

Figure 5A:
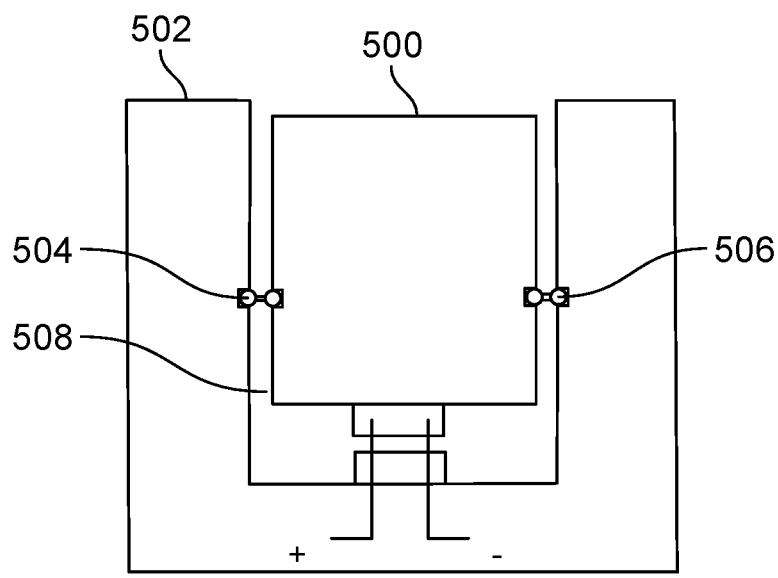
FIG. 5A is a diagram illustrating an embodiment of a pressure-based battery ejection system comprising shear o-rings prior to battery ejection.

FIG. 5A is a diagram illustrating an embodiment of a pressure-based battery ejection system comprising shear o-rings prior to battery ejection. In the example shown, shear o-rings 504 and 506 are positioned on either side of battery 500. The shear o-rings are positioned between the battery and structure 502. In some embodiments, the shear o-rings each comprise two flexible o-rings connected by a component that shears under a threshold force. In some embodiments, the component consists of a brittle material. In the example shown, structure 502 and battery 500 are shaped to accommodate the shear o-rings. Pressure vessel 508 comprises an airtight cavity bounded by shear o-rings 504 and 506, battery 500, and structure 502. In some embodiments, shear o-rings 504 and 506 hold battery 500 in a position wherein the battery is in electrical contact with structure 502.

Figure 5B:
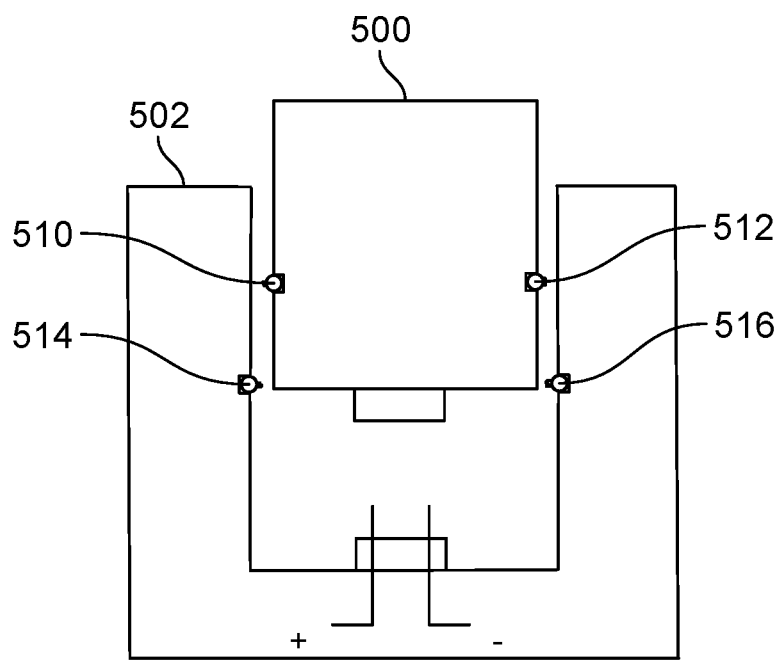
FIG. 5B is a diagram illustrating an embodiment of a pressure-based battery ejection system comprising shear o-rings after battery ejection.

FIG. 5B is a diagram illustrating an embodiment of a pressure-based battery ejection system comprising shear o-rings after battery ejection. In the example shown, the component that connects the o-rings of each shear o-ring has broken due to pressure created by vented gases. As shown, o-rings 510 and 512 previously of shear o-rings 504 and 506 respectively remain positioned in a covering of the battery. For example, o-rings 510 and 512 remain positioned lodged in indents of a can battery 500 is stored in. O-rings 514 and 516 previously of shear o-rings 504 and 506 respectively remain positioned lodged in indents of structure 502. Battery 500 is ejected from its electrical connection with structure 502.

Figure 6A:
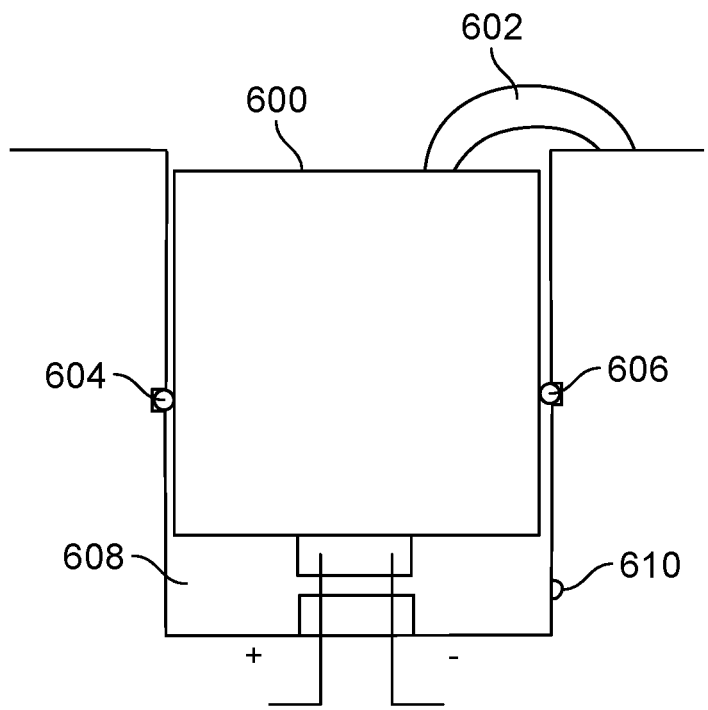
FIG. 6A is a diagram illustrating an embodiment of a pressure-based battery ejection system comprising an orifice in the pressure cavity.

FIG. 6A is a diagram illustrating an embodiment of a pressure-based battery ejection system which includes an orifice in the pressure cavity. In the example shown, battery 600 is held in position via latch 602 while o-rings 604 and 606 create an airtight seal to pressure vessel 608. In the example shown, pressure vessel 608 comprises orifice 610. In various embodiments, pumps or venturis connected to the orifice are used to modify a pressure level inside the pressure vessel or extract vapor samples for battery health monitoring.

In some embodiments, pressure inside pressure vessel 608 is regulated to change characteristics of the battery ejection so that system can be used with different types of batteries which vent gases at different rates. For example, a vacuum or pressure-regulating device attached at orifice 610 may be used to calibrate or adjust the pressure inside the pressure vessel so that the battery is ejected at whatever pressure level corresponds to an unsafe and/or undesirable level. Alternatively, in lieu of pressure regulation (e.g., for systems which do not include a vacuum or pressure-regulating device), latch 602 may be released while battery 600 is still safe to use. For example, the latch may be released when battery 600 is venting at low levels if there is no pressure regulation.

In an aircraft application, a pressure-regulating device may equalize pressure inside the pressure vessel to match pressure outside the aircraft via the orifice. In some embodiments, the pressure-regulating device ensures that pressure changes due to altitude do not cause the seal of the pressure vessel to release. Over long time scales, the pressure-regulating device may cause pressure to equalize, whereas a sudden venting of gas caused by battery malfunction cannot be equalized quickly enough by the pressure-regulating device and the seal is released.

In some embodiments, an interior of the pressure vessel or cavity comprises a thermally resistant coating. Gases released during battery malfunction may be hot. In some embodiments, the coating is ablative and vaporizes when subjected to heat. Vapors created by the coating may be accounted for in calibrating the seal for properly timed battery ejection.

Figure 6B:
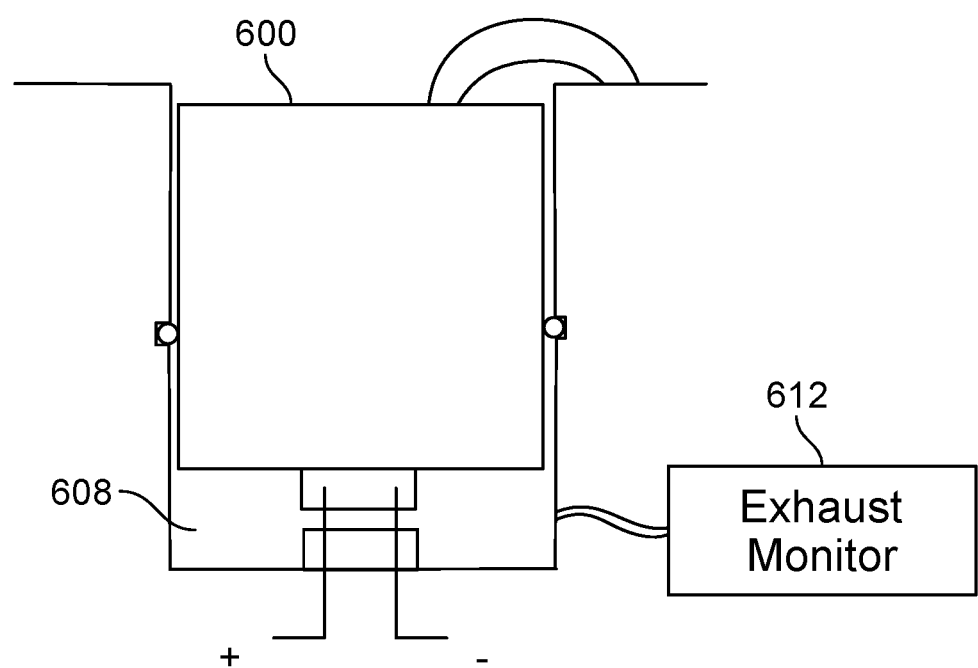
FIG. 6B is a diagram illustrating an embodiment of a pressure-based battery ejection system comprising an exhaust monitor.

FIG. 6B is a diagram illustrating an embodiment of a pressure-based battery ejection system comprising an exhaust monitor. In some embodiments, an exhaust monitor is used to analyze gas in the pressure vessel. In the example shown, exhaust monitor 612 analyzes gas from pressure vessel 608 via a tube that connects the exhaust monitor to the pressure vessel. The exhaust monitor may determine whether battery 600 is (e.g., abnormally and/or dangerously) venting gas based on the composition of gas in the pressure vessel. For example, malfunctioning batteries release electrolytes of specific compositions. In the event exhaust monitor detects the electrolytes in the pressure vessel, the battery may be determined to be (e.g., abnormally and/or dangerously) venting and responsive actions may be performed. In some embodiments, a warning is automatically delivered to relevant systems or persons in the event the battery is determined to be venting. For example, a pilot or autopilot system of an aircraft is automatically and/or in advance warned via an aircraft application of the system. In some embodiments, the pressure-based battery ejection system is calibrated to eject a venting battery only when a volume of released gases indicates the battery cannot be used any longer, which is designed to occur after the indicative electrolytes have been detected. However, a battery that has started to vent or is venting a low volume of gas may provide an (e.g., early) indication to a pilot or autopilot that the aircraft should be landed soon or power intensive aircraft maneuvers should be avoided. In some embodiments, the exhaust monitor is part of a suite of battery management elements. In some embodiments, a pilot or autopilot forcibly ejects a battery based on information collected by the exhaust monitor. For example, batteries of the pressure-based battery ejection system can be actively ejected in addition to passively ejected due to pressure.

Figure 7:
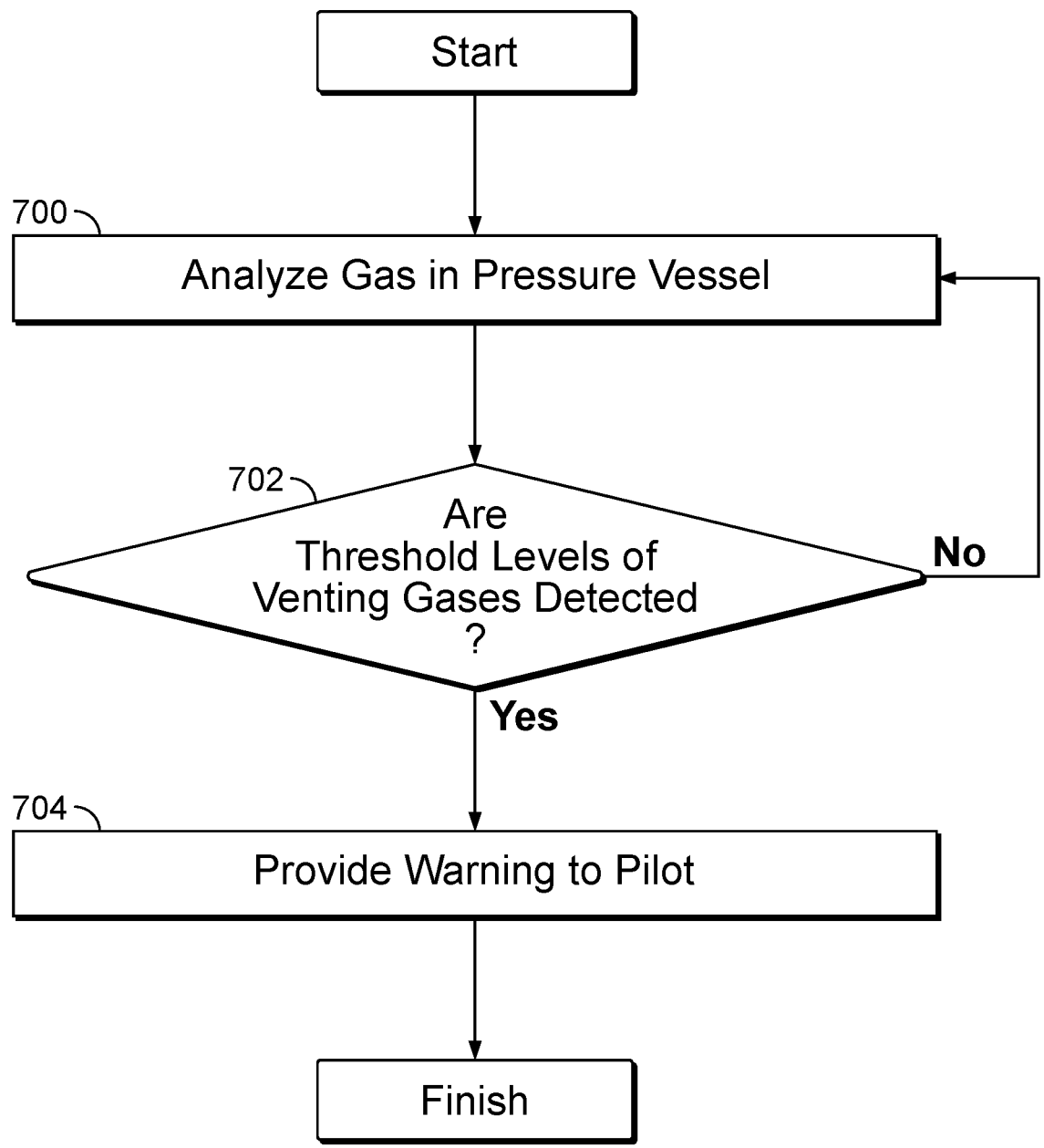
FIG. 7 is a flow diagram illustrating an embodiment of an exhaust monitoring process.

FIG. 7 is a flow diagram illustrating an embodiment of an exhaust monitoring process. At 700, gas in the pressure vessel is analyzed. At 702, it is determined whether threshold levels of venting gases are detected. In some embodiments, various types of gases have different threshold levels. Multiple gases may be required to be detected above their respective threshold levels. In the event threshold levels of venting gases are not detected, gas in the pressure vessel continues to be analyzed. In the event threshold levels of venting gases are detected, at 704 a warning is provided to a pilot. In some embodiments, a battery corresponding to the pressure vessel is actively ejected in the event a second higher threshold level of venting gases is detected.

Figure 8A:
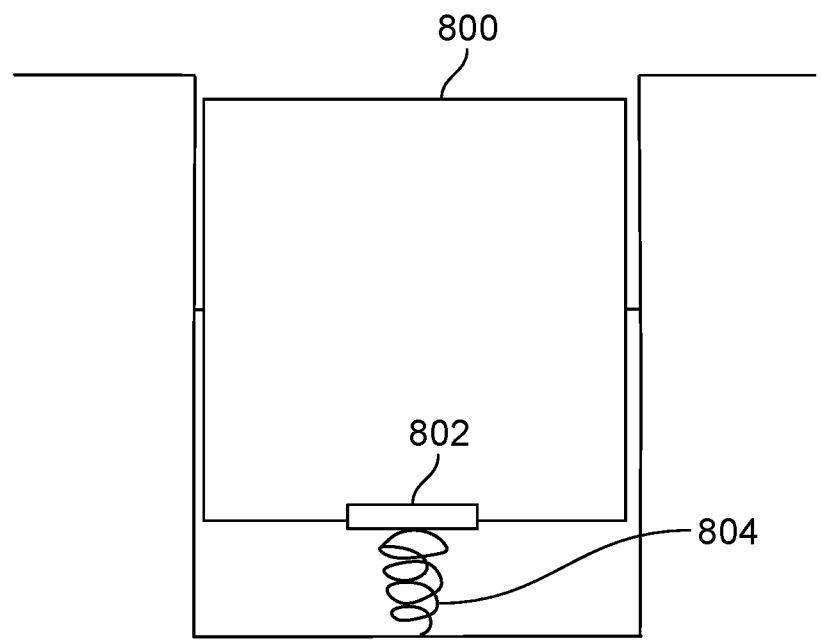
FIG. 8A is a diagram illustrating an embodiment of a spring contact electrical connection.

FIG. 8A is a diagram illustrating an embodiment of a spring contact electrical connection. In various embodiments, the battery is connected to the rest of the electrical system using various configurations of electrical contacts. In some embodiments, the electrical contacts are designed to establish an electrical connection that is easily disconnected. For example, the electrical contacts will not continue to hold the battery in place after the seal of the pressure vessel is released. In some embodiments, the electrical contact of the battery and the electrical contact of the electrical load are configured to disconnect in the event some pushing or pulling force causes the electrical contacts to electrically and/or physically disconnect. In the event the battery is subjected to a force (e.g. pressure from gas build-up or gravity) that causes it to lose contact with the electrical load, the electrical connection is broken. In some embodiments, the electrical contact of the battery must be subjected to a force that pushes it firmly against the electrical contact of the electrical load, otherwise the electrical connection is broken.

In the example shown, battery 800 includes plate 802. Plate 802 is in electrical contact with spring-loaded contact 804. In the event the plate and spring are no longer touching, the electrical connection is broken.

In some embodiments, a pogo pin is used for spring-loaded contact 804. In the event a spring of the pogo pin is compressed, the electrical connection is complete. In the event the pogo pin is not compressed, the electrical connection is broken. In some embodiments, the battery is held in a position that compresses the pogo pin in the event the seal is intact.

In some embodiments, the electrical contact is designed such that an electrical connection will not reconnect or reform after battery ejection. For example, the spring of the pogo pin may be able to withstand the weight of the battery. In the event the battery is ejected up from the structure and falls back down, the weight of the battery would not be sufficient to reform the electrical connection. In some embodiments, a seal (e.g. a bolt, a latch, or a magnet) must be replaced to reform the electrical connection.

Figure 8B:
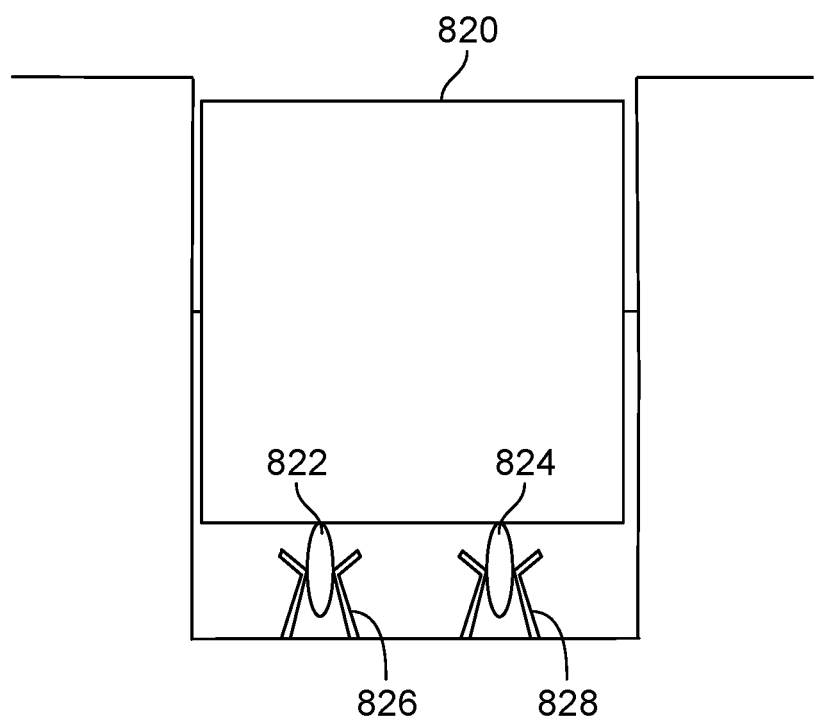
FIG. 8B is a diagram illustrating an embodiment of a blade and spring electrical connection.

FIG. 8B is a diagram illustrating an embodiment of a blade and spring electrical connection. In the example shown, battery 820 includes blades 822 and 824. The blades extrude from the battery. The blades are in electrical contact with springs 826 and 828 (sometimes referred to as a clip). Spring 826 comprises two pins that blade 822 slides in between. In some embodiments, the pins of spring 826 are tensioned to hold blade 822 securely and create a secure electrical connection. Blade 824 is situated in between two pins of spring 828. In the event battery 820 is ejected, blade 822 and 824 may slide out from springs 826 and 828. As shown here, in various embodiments, various types of electrical contacts are used.

Figure 9:
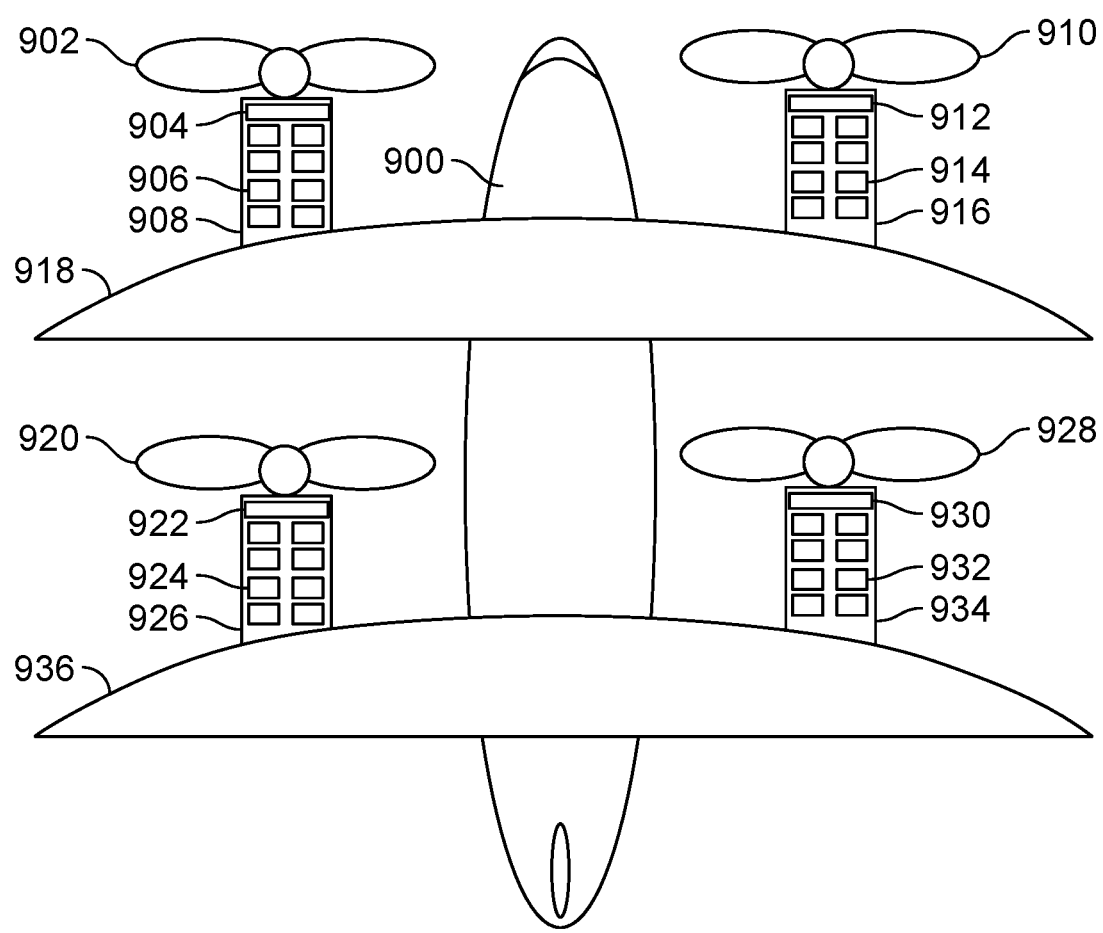
FIG. 9 is a diagram illustrating an embodiment of an aircraft comprising a pressure-based battery ejection system.

FIG. 9 is a diagram illustrating an embodiment of an aircraft which includes a pressure-based battery ejection system. In the example shown, aircraft 900 includes (forward) wing 918 and (rear) wing 936. Wing 918 includes pylons 908 and 916, on either side of the fuselage. Pylon 908 includes rotor 902 and rotor engine 904. Pylon 908 also includes eight batteries, including battery 906. In various embodiments, 4, 10, 12, or any appropriate number of batteries are stored in a single pylon. Pylon 916 includes rotor 910 and rotor engine 912. Pylon 916 also includes eight batteries, including battery 914. Wing 936 includes pylons 926 and 934, on either side of its fuselage. Pylon 926 includes rotor 920 and rotor engine 922. Pylon 926 also includes eight batteries, including battery 924. Pylon 934 includes rotor 928 and rotor engine 930. Pylon 934 also includes eight batteries, including battery 932.

In this example, the pressure-based battery ejection system is installed on each battery shown. For example, battery 906 is stored at least partially within a sealed cavity, wherein a seal on the cavity is configured to release in the event a threshold level of pressure is reached within the sealed cavity. In some embodiments, the batteries are positioned such that an end of the battery that does not have an electrical contact faces downwards towards the ground in normal flight. For example, a latch or panel may be positioned below the battery and hold the battery in place. In the event the latch or panel releases, the battery is dropped and ejected from its electrical connection. The battery may be ejected from its electrical contact via gravity following the release of the seal. In some embodiments, the battery is ejected from its electrical connection but remains in the aircraft. In some embodiments, the battery is ejected completely from the aircraft. In the event the battery is ejected from the aircraft, the aircraft may comprise safety mechanisms to prevent the battery from becoming a projectile. For example, the battery may be attached to the aircraft via a tether.

In some embodiments, the batteries are positioned to be ejected upwards from the aircraft or laterally in parallel with the aircraft's wings. For example, a battery may be ejected upwards from the aircraft. The battery may comprise an electrical contact that will not establish an electrical connection with the aircraft after ejection. The battery may be ejected out to one side of the aircraft rather than downwards.

In some embodiments, the pressure-based battery ejection system is permitted to eject a central or primary battery of an aircraft if/when appropriate. Alternatively, in some embodiments, the system is only permitted to eject batteries that do not have a significant impact on the aircraft's center of gravity or power levels if/when appropriate. For example, the ejection system is only coupled to smaller or outboard batteries wherein the ejection of the batteries does not have a severe adverse effect on flight.

In some embodiments, a battery of the pressure-based battery ejection system is configured to allow vented gases to escape from the battery quickly in the event the battery is disconnected from all electrical connections.

Figure 10:
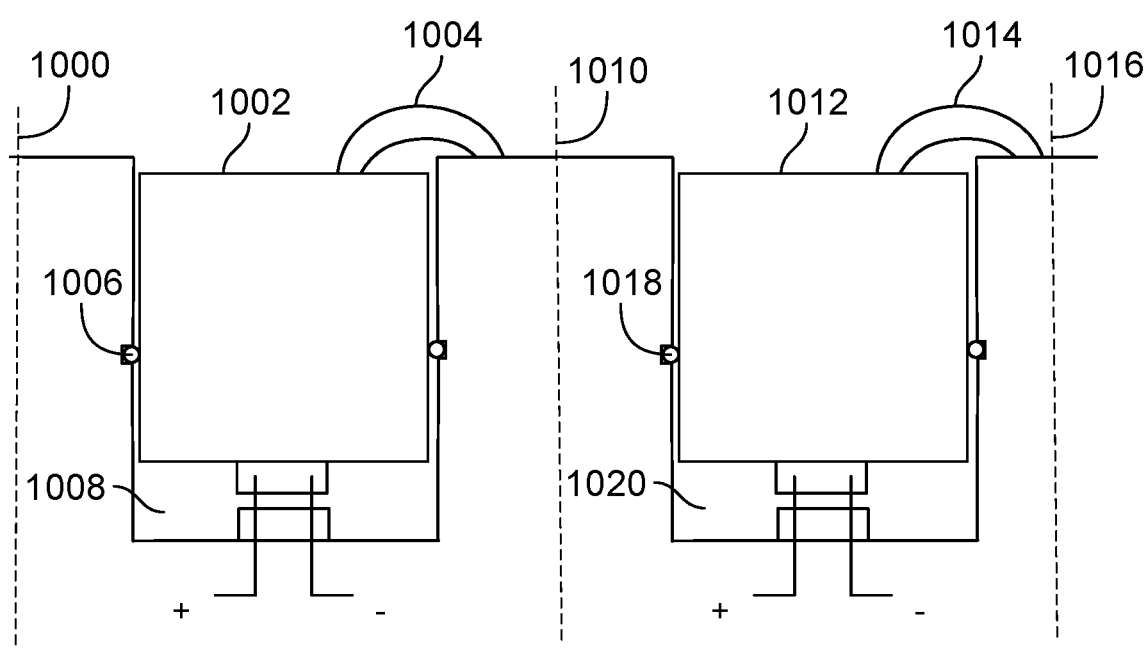
FIG. 10 is a diagram illustrating an embodiment of a barrier between batteries.

FIG. 10 is a diagram illustrating an embodiment of a barrier between batteries. In some embodiments, multiple batteries implementing the pressure-based battery ejection system are positioned next to each other (see, e.g., how multiple batteries are stored in the same pylon in FIG. 9). In some embodiments, a barrier is positioned between batteries. The barrier prevents heat transfer between batteries. For example, barriers 1000, 1010, and 1016 may comprise fire-retardant divisions. The barriers prevent hot gas released from battery 1002 from heating up battery 1012. Excessive heat from one battery may cause an adjacent battery to catastrophically fail, creating a domino effect of failing batteries and fire-retardant divisions would prevent this from happening. In the example shown, battery 1002 and battery 1012 are positioned in alignment. For example, latches 1004 and 1014 are in parallel.

Figure 11A:
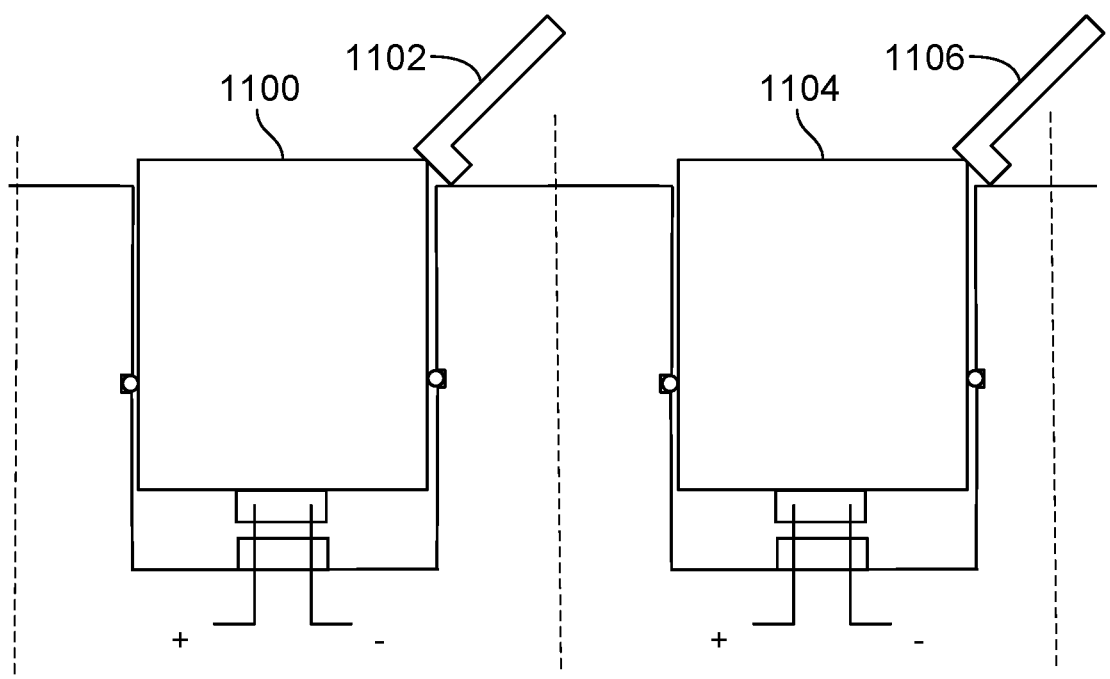
FIG. 11A is a diagram illustrating an embodiment of a latch prior to battery ejection.

FIG. 11A is a diagram illustrating an embodiment of a latch prior to battery ejection. Ejecting multiple adjacent batteries may cause an unsafe change to a center of gravity of a vehicle or aircraft. In some embodiments, ejecting two or more adjacent batteries causes that section of the aircraft to be dangerously underpowered. The weight or power changes that occur due to ejecting multiple batteries in close proximity may pose more danger than continuing to use the venting batteries. In some embodiments, mechanical means are used to prevent a battery from ejecting in the event an adjacent battery has already been ejected. In the example shown, battery 1100 is held in position via L-shaped latch 1102. The latch is used in conjunction with o-rings. Adjacent battery 1104 is sealed partially in a pressure vessel utilizing o-rings and L-shaped latch 1106.

Figure 11B:
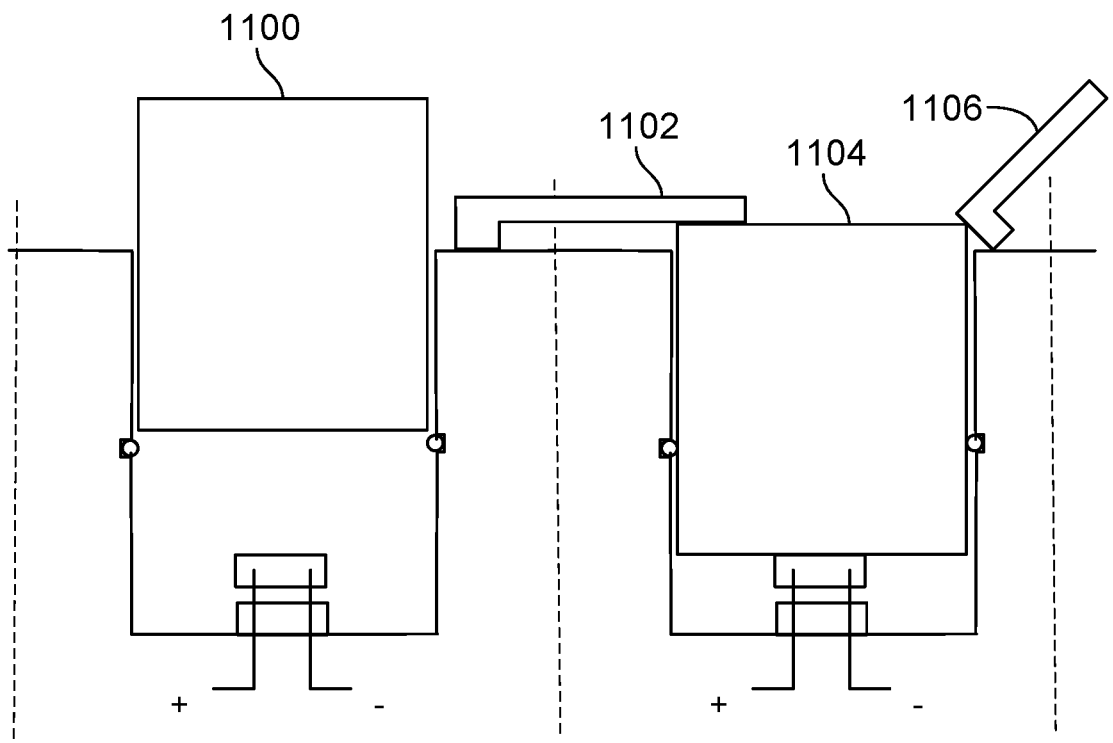
FIG. 11B is a diagram illustrating an embodiment of a deployed latch that prevents a neighbor battery from ejecting.

FIG. 11B is a diagram illustrating an embodiment of a deployed latch that prevents a neighbor battery from ejecting. In the example shown, L-shaped latch 1102 has released, allowing 1100 to be electrically disconnected. L-shaped latch 1102 is now in a position where it restrains battery 1104. In the event latch 1106 releases, battery 1104 will remain electrically connected to the electrical load it powers due to latch 1102.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A battery ejection system, comprising:
  a cavity structure sized to hold at least one battery, wherein:
    a first wall of the cavity structure contacts a surface of the at least one battery via a first sealing member;
    a second wall of the cavity structure contacts another surface of the at least one battery via a second sealing member; and
    a third wall of the cavity structure includes an electrical connection;
  a battery submodule positioned at least partially in the cavity structure, the battery submodule including the at least one battery that releases gas and disconnects from the electrical connection of the third wall of the cavity structure; and
  a seal including the first sealing member and the second sealing member, wherein the seal is configured to:
    in a first mode, form a pressure vessel in a space between the third wall of the cavity structure and a first portion of the battery submodule by sealing off the space between the cavity structure and the first portion of the battery submodule, wherein the seal is positioned near the midsection of the at least one battery in the event that the pressure vessel is formed; and
    in a second mode:
      release, in response to gas released by the at least one battery causes a pressure level in the pressure vessel to exceed a threshold pressure level, wherein the threshold pressure level corresponds to an amount of pressure that the seal of the cavity is designed to handle before releasing, wherein in the event that the at least one battery releases gas, the at least one battery releases gas towards the third wall, and wherein a force of the released gas pushes the at least one battery out of the cavity in the event that the gas released by the at least one battery causes the pressure level in the pressure vessel to exceed the threshold pressure level; and
      cause the battery submodule to be ejected in response to a force of pressure buildup of the gas released by the at least one battery.

2. The system of claim 1, wherein the battery submodule releases gas into the pressure vessel in the event the battery submodule malfunctions.

3. The system of claim 1, wherein the battery submodule comprises a covering that directs gas released by the battery submodule.

4. The system of claim 1, wherein in the first mode, the battery submodule is electrically connected to an electrical load via an electrical contact of the battery submodule, wherein the electrical connection of the third wall of the cavity structure is an electrical contact of the electrical load.

5. The system of claim 4, wherein the electrical load comprises an aircraft or other vehicle.

6. The system of claim 4, wherein the electrical contact of the battery submodule and the electrical contact of the electrical load are configured to disconnect in the event the at least one battery is subjected to a force directed in a direction opposite from the electrical contact of the electrical load.

7. The system of claim 6, wherein in the second mode, the force directed in the direction opposite from the electrical contact of the electrical load is exerted due to a build-up of pressure in the pressure vessel or due to gravity.

8. The system of claim 6, wherein the electrical contact of the battery submodule comprises a pogo pin.

9. The system of claim 4, wherein in the first mode, the seal exerts a force on the battery submodule that pushes the electrical contact of the battery submodule against the electrical contact of the electrical load.

10. The system of claim 1, wherein in the first mode, the seal causes the pressure vessel to be airtight.

11. The system of claim 1, wherein the seal is configured to shear under the threshold pressure level.

12. The system of claim 1, wherein the seal comprises a bistable seal that is configured to change from a first state to a second state when subjected to the threshold pressure level.

13. The system of claim 1, wherein the seal comprises a latch, an o-ring, a magnet, or a bolt.

14. The system of claim 1, wherein the seal comprises a first component that exerts a force on the battery submodule that pushes an electrical contact of the battery submodule against an electrical contact of an electrical load and a second component that creates an airtight seal between the battery submodule and the electrical load, forming the pressure vessel.

15. The system of claim 14, wherein a latch is used to hold the battery submodule in electrical contact with the electrical load and an o-ring is used to create an airtight seal between the battery submodule and the electrical load.

16. The system of claim 1, wherein the pressure vessel comprises an orifice.

17. The system of claim 16, wherein a pressure regulator or vacuum is attached via the orifice.

18. The system of claim 16, wherein a gas monitor is attached via the orifice.

19. The system of claim 18, wherein a warning is automatically delivered to an operator, pilot, or system in the event the battery is determined to be releasing gas based on the gas monitor.

20. The system of claim 1, wherein the battery ejection system is provided in a pylon included in a wing of a vehicle.

21. The system of claim 1, wherein the battery submodule is positioned fully within the cavity structure in the first mode, and the system further comprises:
  at least one magnet; and
  a panel, wherein the at least one magnet holds the panel against the cavity structure such that the battery submodule and the cavity structure maintain contact in the first mode.

22. The system of claim 1, wherein the seal is aligned at one end of the battery submodule leaving a second portion of the battery submodule unsealed.

* * * * *

UNITED STATES PATENT AND TRADEMARK OFFICE
CERTIFICATE OF CORRECTION

| | |
|---|---|
| PATENT NO. | : 11,271,267 B1 |
| APPLICATION NO. | : 15/809831 |
| DATED | : March 8, 2022 |
| INVENTOR(S) | : George James Hansel |

It is certified that error appears in the above-identified patent and that said Letters Patent is hereby corrected as shown below:

In the Specification

In Column 8, Line 58, after "e.g.", insert --,--.

In Column 9, Line 16, after "e.g.", insert --,--.

In Column 9, Line 27, after "ejected,", delete "blade" and insert --blades-- therefor.

Signed and Sealed this
Nineteenth Day of July, 2022

Katherine Kelly Vidal
*Director of the United States Patent and Trademark Office*